(12) United States Patent
Dorfmann et al.

(10) Patent No.: US 10,041,802 B1
(45) Date of Patent: Aug. 7, 2018

(54) METHODS AND SYSTEMS FOR DEPICTING OWN SHIP

(75) Inventors: Cindy Dorfmann, Darmstadt (DE); Andreas Sindlinger, Weinheim (DE); Sven David Aspen, Sherwood, OR (US)

(73) Assignee: THE BOEING COMPANY, Chicago, IL (US)

( * ) Notice: Subject to any disclaimer, the term of this patent is extended or adjusted under 35 U.S.C. 154(b) by 710 days.

(21) Appl. No.: 13/247,638

(22) Filed: Sep. 28, 2011

(51) Int. Cl.
  *G08G 1/123* (2006.01)
  *G01C 21/32* (2006.01)
  *G01C 21/26* (2006.01)
  *G09B 29/10* (2006.01)

(52) U.S. Cl.
  CPC .............. *G01C 21/32* (2013.01); *G01C 21/26* (2013.01); *G09B 29/106* (2013.01)

(58) Field of Classification Search
  CPC ..... G01C 23/00; G01C 23/005; G08G 5/0021
  USPC ................. 340/979; D12/192, 345
  See application file for complete search history.

(56) References Cited

U.S. PATENT DOCUMENTS

| | | | |
|---|---|---|---|
| 3,521,227 A | | 7/1971 | Congleton et al. |
| 3,652,836 A | * | 3/1972 | Richardson et al. ......... 701/410 |
| 3,696,385 A | | 10/1972 | Burns |
| 4,283,705 A | * | 8/1981 | James et al. .................. 340/973 |
| 4,326,189 A | * | 4/1982 | Crane .......................... 340/973 |
| 5,045,860 A | * | 9/1991 | Hodson ................. G01S 5/0009 342/451 |
| 5,136,301 A | * | 8/1992 | Bechtold et al. ............. 342/176 |
| 5,844,504 A | * | 12/1998 | Etherington ................... 340/973 |
| 5,969,665 A | * | 10/1999 | Yufa .................... G01S 13/9307 342/41 |
| 6,028,536 A | * | 2/2000 | Voulgaris ....................... 340/975 |
| 6,038,498 A | * | 3/2000 | Briffe et al. ....................... 701/3 |
| 6,057,786 A | * | 5/2000 | Briffe et al. .................. 340/975 |
| 6,111,525 A | * | 8/2000 | Berlioz et al. ................ 340/971 |
| 6,112,141 A | * | 8/2000 | Briffe et al. ..................... 701/14 |
| 6,131,297 A | * | 10/2000 | Yamamoto ............. G01C 19/38 33/324 |
| 6,150,960 A | * | 11/2000 | Voulgaris ....................... 340/975 |
| 6,199,471 B1 | * | 3/2001 | Perruzzi .................. F41G 9/006 244/3.1 |
| 6,335,695 B1 | * | 1/2002 | Kawasaki ................ 340/995.14 |

(Continued)

OTHER PUBLICATIONS http://www.allstar.fiu.edu/aero/images/headingindicator.gif; Apr. 8, 2010; 1 page.

(Continued)

*Primary Examiner* — Jean Paul Cass
(74) *Attorney, Agent, or Firm* — Armstrong Teasdale LLP

(57) ABSTRACT

A method for depicting own ship on a display is described. The method includes receiving position data and heading data for own ship from at least one system, correlating, with a processing device, the position data and heading data with data from a map database, generating a map display on the display based on the correlation between the position data and the data from the map database, overlaying a depiction of own ship on the map display, the depiction based on the correlation between the position and heading data and the data from the map database, and encircling the own ship depiction with a circle overlay and a north indicator overlay proximate the circle overlay, the north indicator indicating a north direction.

22 Claims, 8 Drawing Sheets

(56) References Cited

U.S. PATENT DOCUMENTS

| | | | | |
|---|---|---|---|---|
| 6,408,248 B1* | 6/2002 | Yancey, Jr. | ............ | B60Q 9/008 340/435 |
| 6,453,570 B1* | 9/2002 | Rahn | ............ | G01C 19/20 33/324 |
| 6,534,712 B1* | 3/2003 | Pitrone | ............ | G02B 6/4428 174/705 |
| 6,885,313 B2* | 4/2005 | Selk et al. | ............ | 340/945 |
| 6,934,608 B2 | 8/2005 | Qureshi | | |
| 7,054,725 B2* | 5/2006 | Burch et al. | ............ | 244/75.1 |
| 7,114,263 B2* | 10/2006 | Toda | ............ | G01C 19/38 33/327 |
| 7,191,406 B1* | 3/2007 | Barber et al. | ............ | 715/771 |
| 7,194,342 B1 | 3/2007 | Horvath et al. | | |
| 7,215,256 B2* | 5/2007 | Reusser et al. | ............ | 340/975 |
| 7,295,901 B1* | 11/2007 | Little et al. | ............ | 701/16 |
| 7,308,343 B1* | 12/2007 | Horvath et al. | ............ | 701/3 |
| 7,392,486 B1* | 6/2008 | Gyde et al. | ............ | 715/780 |
| 7,508,322 B1* | 3/2009 | Krenz et al. | ............ | 340/976 |
| 7,772,994 B2* | 8/2010 | He | ............ | 340/976 |
| 7,834,779 B2* | 11/2010 | He et al. | ............ | 340/973 |
| 7,965,223 B1* | 6/2011 | McCusker | ............ | G01S 13/913 340/961 |
| 8,159,464 B1* | 4/2012 | Gribble et al. | ............ | 345/173 |
| 8,184,020 B2* | 5/2012 | He | ............ | 340/976 |
| 8,244,466 B2* | 8/2012 | DeJonge et al. | ............ | 701/465 |
| 8,264,378 B1* | 9/2012 | Martins et al. | ............ | 340/979 |
| 8,306,745 B1* | 11/2012 | Clark et al. | ............ | 701/455 |
| 8,314,719 B2* | 11/2012 | Grothe | ............ | 340/961 |
| 8,392,039 B2* | 3/2013 | He et al. | ............ | 701/14 |
| 8,395,533 B2* | 3/2013 | Ganille et al. | ............ | 340/963 |
| 8,514,102 B2* | 8/2013 | Palanisamy et al. | ............ | 340/961 |
| 8,599,046 B2* | 12/2013 | Ca | ............ | 340/947 |
| 8,645,056 B2* | 2/2014 | Wipplinger et al. | ............ | 701/408 |
| 8,670,880 B2* | 3/2014 | Baxter | ............ | 701/14 |
| 2003/0210228 A1* | 11/2003 | Ebersole | ............ | G02B 27/017 345/157 |
| 2007/0085707 A1* | 4/2007 | Wyatt | ............ | 340/979 |
| 2007/0168120 A1* | 7/2007 | Vandenbergh et al. | ........ | 701/208 |
| 2007/0236366 A1* | 10/2007 | Gur | ............ | G06K 9/00 340/945 |
| 2008/0114537 A1* | 5/2008 | Aspen | ............ | 701/207 |
| 2008/0125962 A1* | 5/2008 | Wipplinger et al. | .......... | 701/201 |
| 2008/0275642 A1* | 11/2008 | Clark et al. | ............ | 701/208 |
| 2009/0231163 A1 | 9/2009 | He | | |
| 2009/0248297 A1* | 10/2009 | Feyersisen et al. | .......... | 701/206 |
| 2010/0082186 A1* | 4/2010 | Burgin et al. | ............ | 701/9 |
| 2010/0156674 A1 | 6/2010 | Dwyer et al. | | |
| 2010/0280753 A1* | 11/2010 | Chytil et al. | ............ | 701/208 |
| 2011/0010082 A1* | 1/2011 | Wilson et al. | ............ | 701/200 |
| 2011/0045848 A1* | 2/2011 | Okeya | ............ | 455/456.3 |
| 2011/0196598 A1* | 8/2011 | Feyereisen | ............ | G01C 21/00 701/120 |
| 2011/0199237 A1* | 8/2011 | Clark | ............ | G08G 5/0021 340/970 |
| 2011/0199239 A1* | 8/2011 | Lutz et al. | ............ | 340/995.14 |
| 2012/0310524 A1* | 12/2012 | Pepitone et al. | ............ | 701/411 |

OTHER PUBLICATIONS http://www.kienzi.ch/flights/2008/images/20080329_121812_Flug_N466M_Zuerich_MontBlanc_Matterhorn_Jungfrau_Saentis_ZuerichS.JPG: Mar. 29, 2008; 1 page.

http://www.kienzi.ch/flights/2008/images/20080329_121808_Flug_N466M_Zuerich_MontBlanc_Matterhorn_Jungfrau_Saentis_Zuerich$JPG; Mar. 29, 2008; 1 page.

* cited by examiner

METHODS AND SYSTEMS FOR DEPICTING OWN SHIP

BACKGROUND

The field of the disclosure relates generally to aircraft cockpit displays and more particularly, to methods and systems for depicting own ship on aircraft cockpit displays and charting devices.

At least some known aircraft include cockpit displays use charts and other information displays that aid in navigation and situational awareness. For example, charts displayed on electronic displays, referred to herein as electronic charts, typically are used for a wide variety of aspects of flight and flight planning. However, certain elements on such electronic charts may be difficult to read. One reason for this difficulty is that such electronic charts are formatted in the same fashion as paper charts.

On paper aviation charts, for example, the north indicator is placed in the upper right corner of the chart. As the electronic charts are patterned after the paper charts, current digital charting applications also show the north indicator in a static position. The north indicator or compass rose is required to be shown on charting applications but is placed as a chart overlay symbol in a static position, requiring a user to move their view from the own ship indicator to another screen location to determine orientation.

Such digital charting applications may allow the user to switch an appearance of the digital chart from a north up orientation to a heading up orientation depending on the selected/current mode. On certain flight instruments the own ship symbol is found in the heading indicator. However and as stated above, such configurations require a user to change their view and focus away from the own ship indicator to determine an orientation.

In summary, existing solutions have two separate elements for own ship depiction and north indicator depiction which are located at different locations on the map and therefore a pilot has to scan both elements to get an overall understanding of the current aircraft state.

BRIEF DESCRIPTION

In one aspect, a method for depicting own ship on a display is provided. The method includes receiving position data and heading data for own ship from at least one system, correlating, with a processing device, the position data and heading data with data from a map database, generating a map display on the display based on the correlation between the position data and the data from the map database, overlaying a depiction of own ship on the map display, the depiction based on the correlation between the position and heading data and the data from the map database, and encircling the own ship depiction with a circle overlay and a north indicator overlay proximate the circle overlay, the north indicator indicating a north direction.

In another aspect, a system is provided that includes a processing device, a memory communicatively coupled to the processing device and including map data, a display communicatively coupled to the processing device, and a communications interface communicatively coupled to the processing device. The processing device is operable to receive position data and heading data for own ship via the communications interface, correlate the received position data and heading data with the map data, generate a map display on the display based on the correlation between the position data and the map data, overlay a depiction of own ship on the display, the depiction based on the correlation between the position and heading data and the map data, and encircle the own ship depiction with a circle overlay and a north indicator overlay proximate the circle overlay, the north indicator indicating a north direction.

In still another aspect, one or more computer-readable storage media having computer-executable instructions embodied thereon are provided, wherein when executed by at least one processor, the computer-executable instructions cause the at least one processor to receive position data and heading data for own ship from at least one system, correlate the position data and heading data with data from a map database, generate a map display based on the correlation between the position data and the data from the map database, overlay a depiction of own ship on the map display, the depiction based on the correlation between the position and heading data and the data from the map database, and encircle the own ship depiction with a circle overlay and a north indicator overlay proximate the circle overlay, the north indicator indicating a north direction The features, functions, and advantages that have been discussed can be achieved independently in various embodiments or may be combined in yet other embodiments further details of which can be seen with reference to the following description and drawings.

DETAILED DESCRIPTION

The described embodiments are directed to the implementation of an own ship symbol combined with a north indicator on a flight display with the north indicator being in a close circle about the own ship position. The embodiments may be practiced in any of an aviation, land navigation, or water navigation environment. With the location of a north indicator proximate an own ship depiction, a user is able to stay focused on the own ship indicator and readily determine compass orientation.

Figure 1:
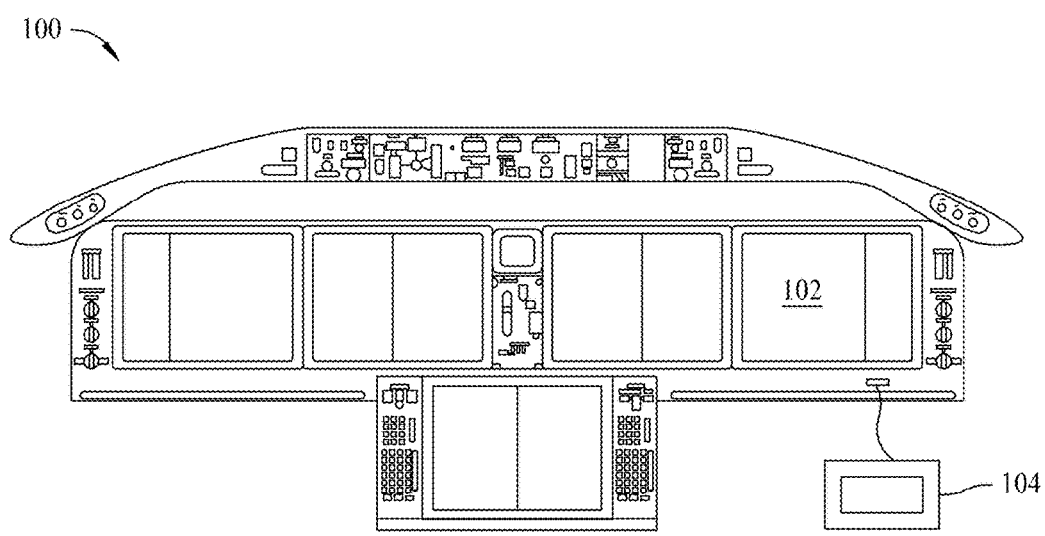
FIG. 1 is a forward perspective view of an exemplary aircraft cockpit display panel that includes at least one display screen in accordance with an embodiment of the present invention.

FIG. 1 is a forward perspective view of an exemplary aircraft cockpit display panel 100 that includes at least one display screen 102 in accordance with an illustrative embodiment. In the illustrative embodiment, display screen is positioned on aircraft cockpit display panel 100. In an alternative embodiment, display screen 102 is positioned on an auxiliary panel (not shown) located in the cockpit of the aircraft. During aircraft operation, display screen 102 is available for viewing by a pilot and/or co-pilot of the aircraft. Display screen 102 may be used to view data included in an electronic flight bag 104, which may be embodied as a standalone device such as, but not limited to a PDA, laptop PC, or portable touchscreen device, or as a software component of a system executing on a processor that is part of a subsystem of the aircraft.

In the exemplary embodiment, the electronic flight bag 104 includes an electronic storage device configured to store various user-configurable flight-related objects for all required and desired information for a particular flight, such as flight routes, as defined by, for example, way-points, airport information, temporary flight restrictions, and weather information as well as any other user-defined objects associated with a flight, ground operations, and/or flight planning. Certain of these include electronic versions of aviation charts and/or navigation charts, sometimes collectively referred to herein as electronic charts or maps. The electronic flight bag 104 may receive data from various aircraft and ground sensors and systems, determines flight information, for example, position data and heading data, based on the received data in real-time, and displays the flight information and/or alerts the flight crew through display screen 102 and other aural and/or visual indicators positioned on cockpit display panel 100. One or more of the flight systems and the electronic flight bag 104 may correlate position data and heading data with the electronic map data. Such flight information provides the flight crew with additional situational awareness during all phases of aircraft operation. In accordance with the embodiments described herein, the above described examples are considered to incorporate one or more touch screens.

As explained above, the embodiments are directed to a north indicator that is included proximate or about the own ship symbol and not displayed separately on, for example, an electronic map or screen. The embodiments provide better situational awareness due to the fact that own ship heading and north direction indicator can both be seen at a glance. The embodiments further reduce screen cluttering because a separate north indicator is not needed. Workload is reduced because in planning and live mode the same indicator can be used, independent from the phase of flight. As a result, current 2D aircraft attitude information (position and heading) can be found combined in one screen location.

Figure 2:
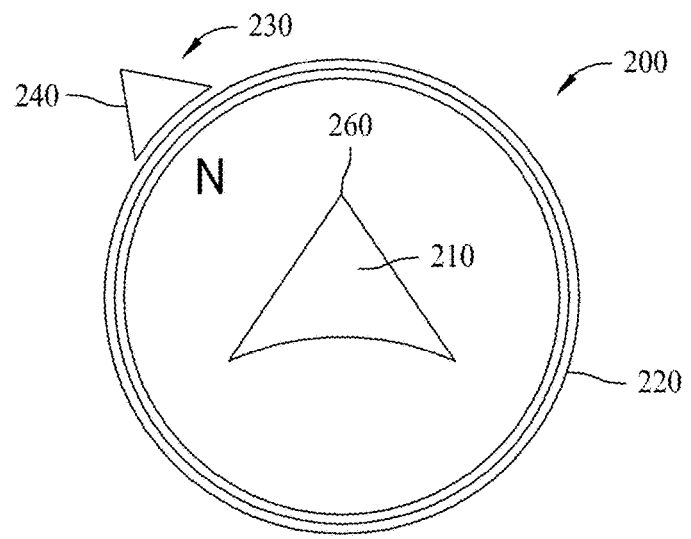
FIG. 2 is an illustration of a first embodiment of an own ship symbol in a heading up orientation.
Figure 3:
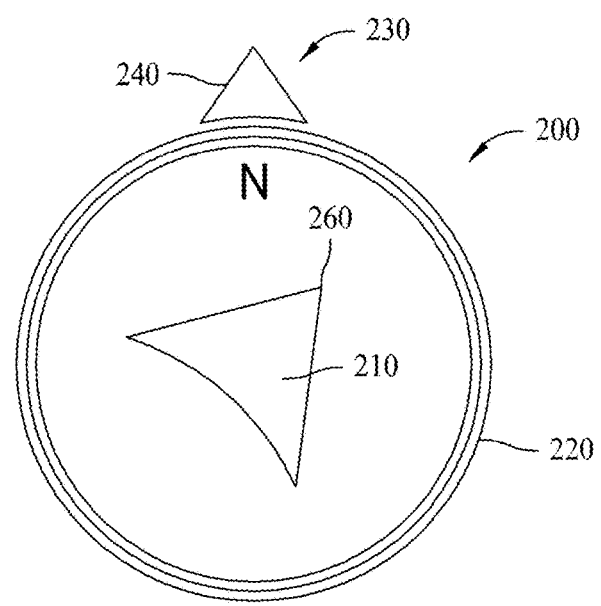
FIG. 3 is an illustration of the first embodiment of an own ship symbol in a north up orientation.

FIG. 2 is an illustration of one embodiment of an own ship symbol 200 in a heading up orientation. Own ship symbol 200 includes an own ship indicator 210 that has a circle 220 drawn around it. In the heading up mode, a north indicator 230 is operable to rotate around the circle 220 and thus about the own ship indicator 210 as the own ship indicator 210 stays in a static position. In a north up mode, the own ship indicator 210 rotates within the circle 220 while the north indicator 230 stays in a static position which represents north as shown in FIG. 3. Within the circle 220, in the illustrated embodiment, is a capital "N" to indicate North. Outside of the circle 220, at the same position as the "N" is a triangle 240 or arrow that points in the north direction. In the heading up mode, both the "N" and the triangle 240 of the north indicator 230 rotate about the circle 220 as own ship direction changes, the ownship indicator remaining in the static position shown in FIG. 2. In embodiments, the north indicator 230 and triangle 240 may be displayed in a different color than are the own ship indicator 210 and circle 220. In either of the embodiments, a general heading direction can be discerned from the direction of the tip 260 of the own ship indicator 210 with respect to the north indicator 230. The own ship symbol 200 and components thereof may be referred to as one or more overlays when described with respect to a map display.

Figure 4:
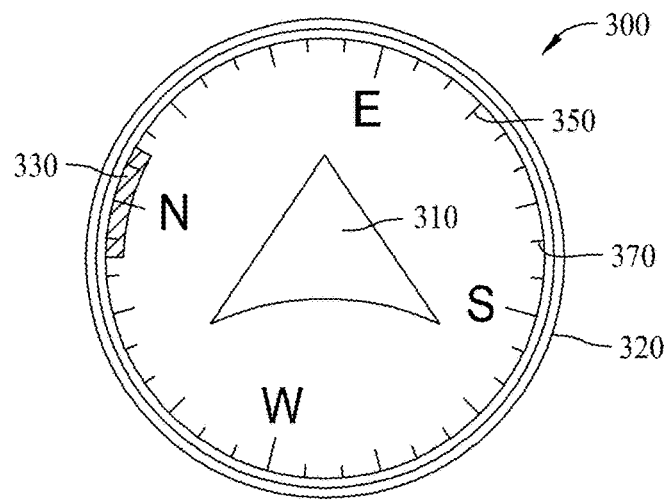
FIG. 4 is an illustration of a second embodiment of an own ship symbol in a heading up orientation.
Figure 5:
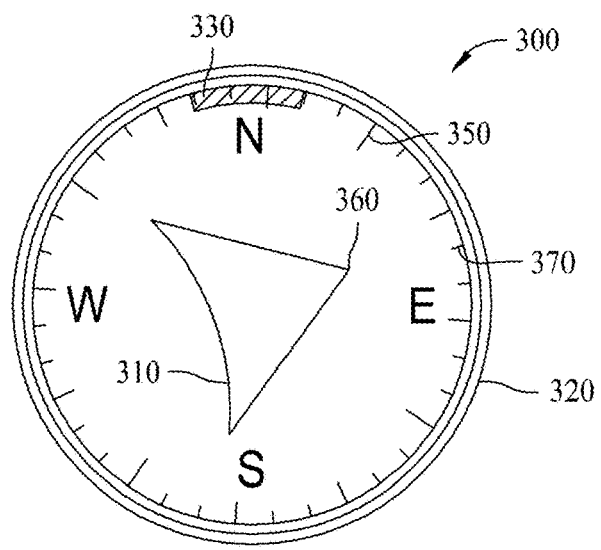
FIG. 5 is an illustration of the second embodiment of an own ship symbol in a north up orientation.

FIG. 4 is an illustration of another embodiment of an own ship symbol 300. Own ship symbol 300 includes an own ship indicator 310 that has a circle 320 drawn around it. In one embodiment, own ship symbol 300 includes a colored highlight 330 that operates to highlight the north indicator "N" of a compass rose 350 within the circle 320. In heading up mode, the north indicator "N" and the colored highlight 330 rotate around the own ship indicator 310 which stays in the static position as shown. In north up mode, shown in FIG. 5, the own ship indicator 310 rotates while the north indicator "N" stays in a static position that represents north. The colored highlight 330 is proximate the north indicator "N" in both embodiments. The heading can be discerned from the direction of the tip 360 of the own ship indicator 310 with respect to the compass rose 350. In the illustrated embodiment, the compass rose 350 is located within the circle 320 with the compass points pointing towards the own ship indicator 310. The compass rose 350 contains the aforementioned "N" as well as "E", "S", and "W". In the illustrated embodiment, tick marks 370 form the remainder of the compass rose 350 with a set number of degrees, for example, ten degrees, between each mark 370. The colored highlight 330 is centered on the "N" and extends one or two tick marks 370 to each side such that it is plainly visible. In embodiments, the colored highlight 330 may be displayed in a different color than are the own ship indicator 310 and circle 320 and compass rose 350. The own ship symbol 300 and components thereof may be referred to as one or more overlays when described with respect to a map display. The various embodiments of FIGS. 2, 3, 4, and 5 differ only in the level of detail (i.e., the inclusion of the compass rose 350).

Figure 6:
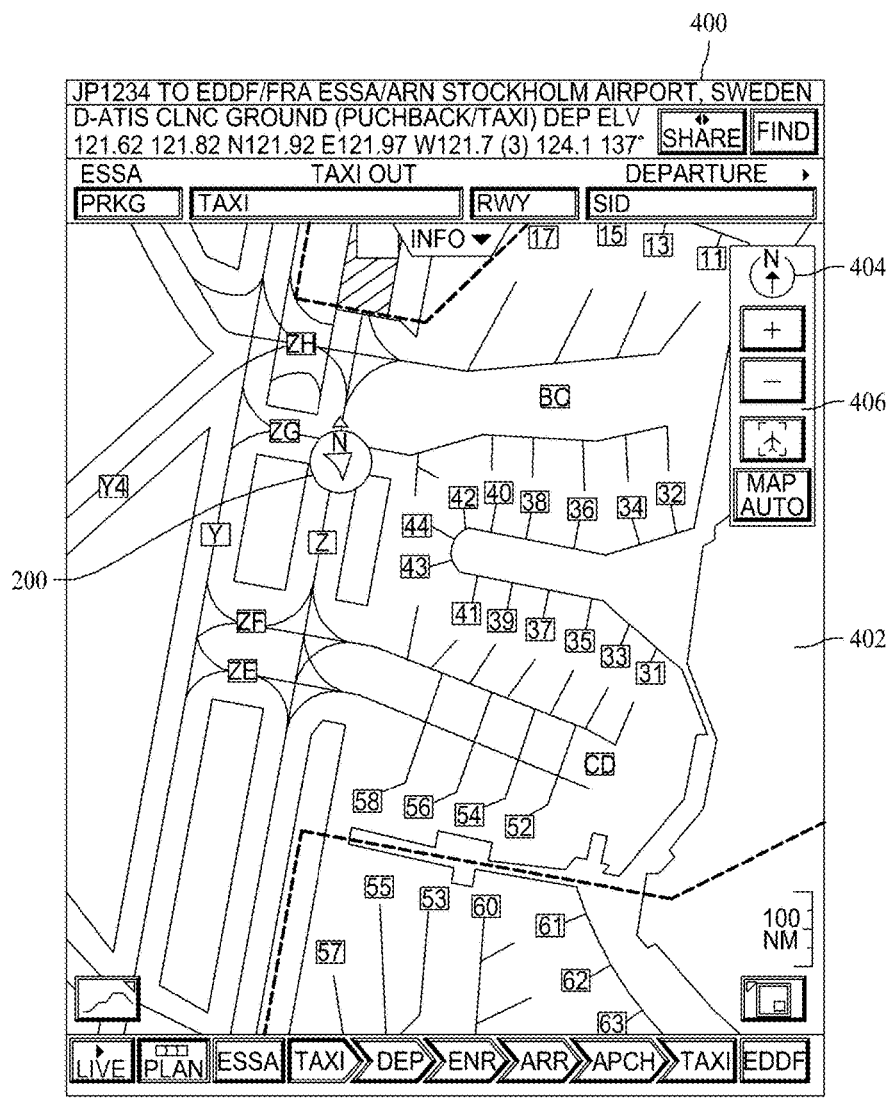
FIG. 6 is an image of an airport map that incorporates the own ship symbol of FIG. 3.
Figure 7:
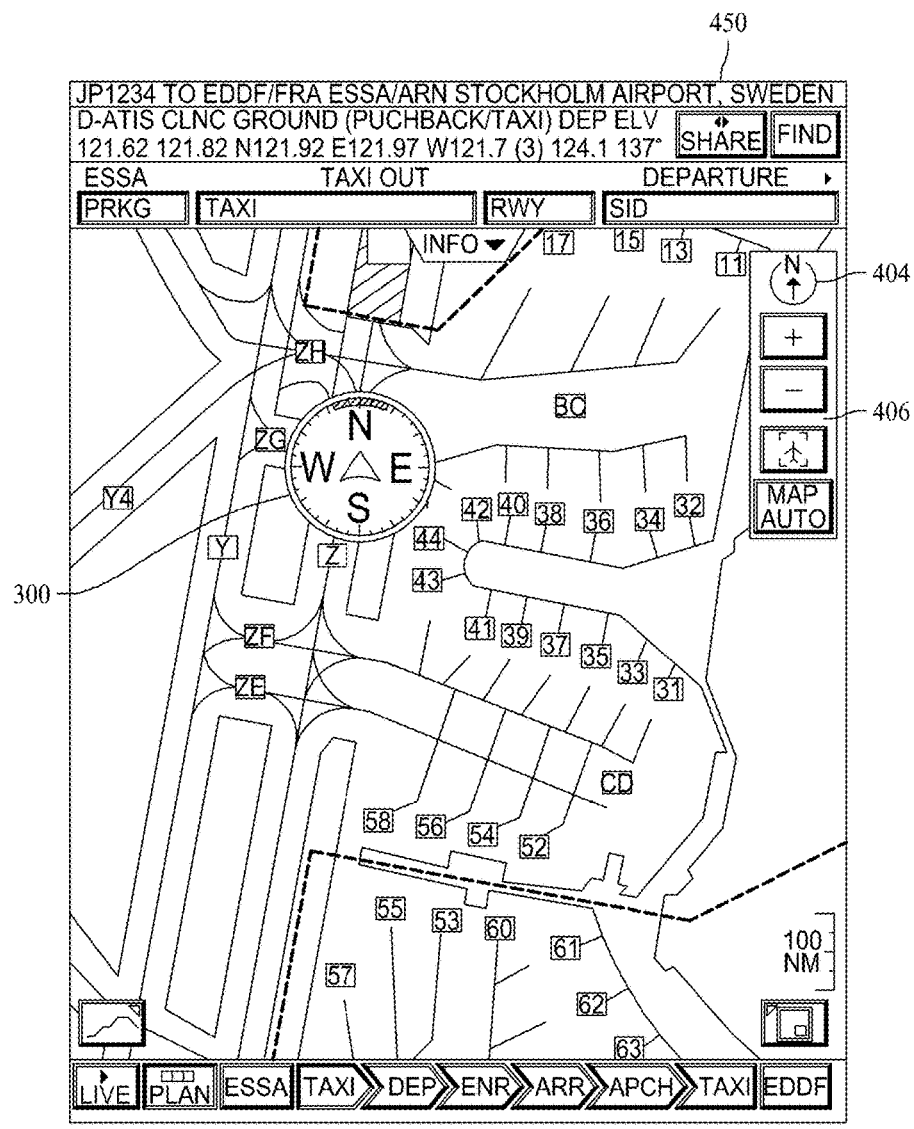
FIG. 7 is an image of an airport map that incorporates the own ship symbol of FIG. 5.

FIG. 6 is an image 400 of an airport map 402 that might be displayed as part of a next generation airport moving map application. Image 400 incorporates own ship symbol 200 in a north up mode. Image 400 further provides a user with a relative position of own ship 200 with respect to the map 402. Map 402 includes the traditional north indicator 404 above the navigation bar 406. As easily understood by those skilled in the art, the described embodiments might be utilized to eliminate the north indicator 404 as own ship symbol 200 provides a north indication. Image 400 illustrates both the problem with charting layouts and a proposed solution offered by the presently disclosed embodiments. With regard to the current charting layouts, there is a separation between the north indicator 404 and the own ship depiction. A user has to shift their focus, in current implementations, back and forth between the two. In the described embodiments, the north indicator and own ship depiction are combined in own ship symbol 200 which provides the benefit to the user of not having to shift their focus back and forth as described above. FIG. 7 is an image 450 that incorporates the same map 402 as does FIG. 6, but with own ship symbol 300.

Figure 8:
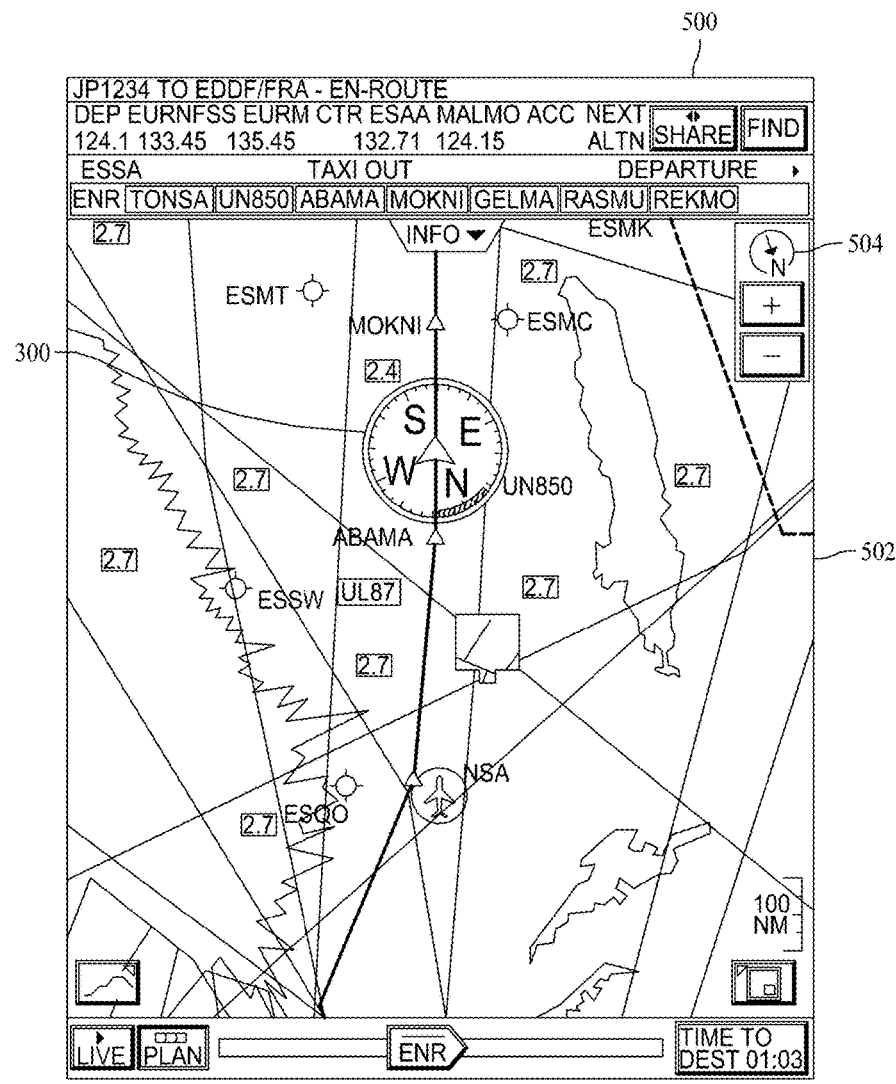
FIG. 8 is an image of a navigation chart that incorporates the own ship symbol of FIG. 4.
Figure 9:
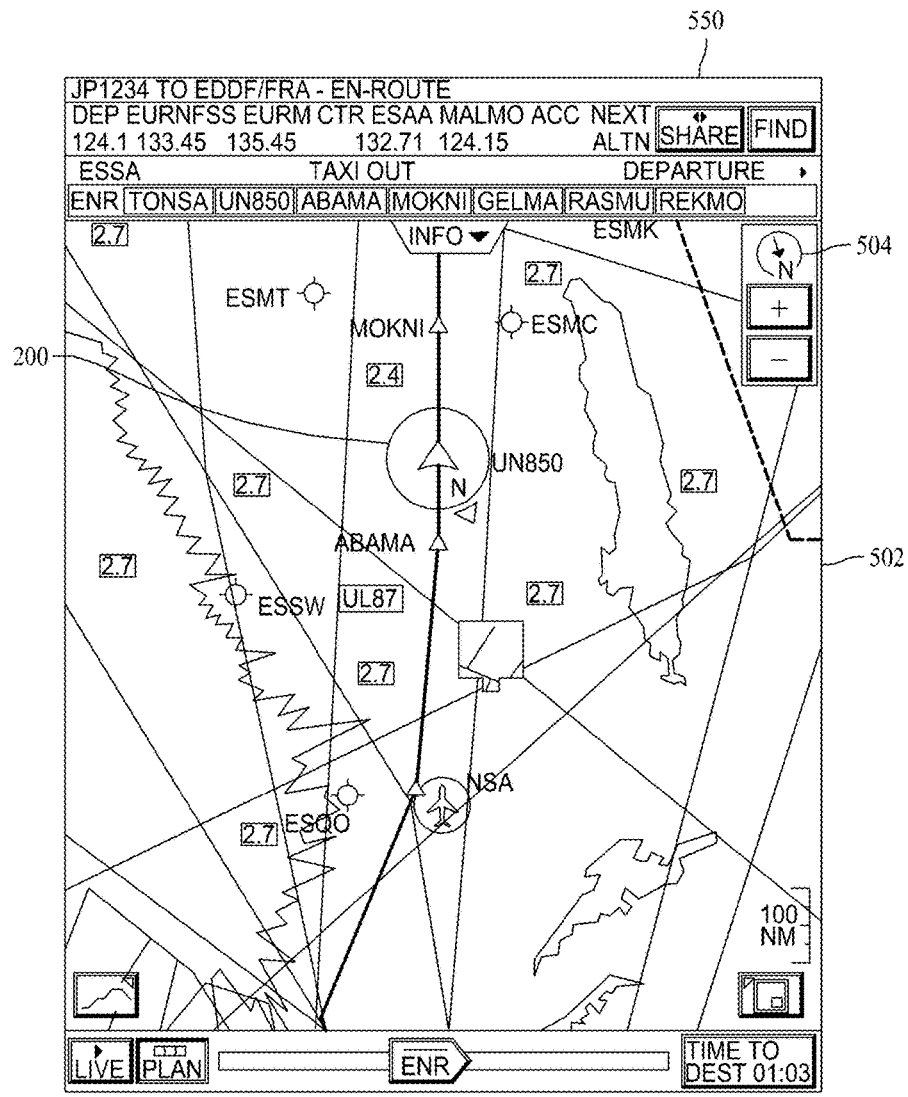
FIG. 9 is an image of a navigation chart that incorporates the own ship symbol of FIG. 2.

FIG. 8 is an example image of a navigation chart 500 which incorporates own ship symbol 300 into the moving map 502 in a heading up mode. Such an embodiment would allow for the removal of the north indicator 504 that is currently utilized in such moving map displays. FIG. 9 is an image 550 that incorporates the same map 502 as does FIG. 8, but with own ship symbol 200.

In one embodiment, technical effects of the methods, systems, and computer-readable media described herein include at least one of: (a) receiving position data and heading data for own ship from at least one system, (b) correlating, with a processing device, the position data and heading data with data from a map database, (c) generating a map display on the display based on the correlation between the position data and the data from the map database, (d) overlaying a depiction of own ship on the map display, the depiction based on the correlation between the position and heading data and the data from the map database, and (e) encircling the own ship depiction with a circle overlay and a north indicator overlay proximate the circle overlay, the north indicator indicating a north direction.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

As easily understood by those skilled in the art, the embodiments described herein are capable of being implemented on a variety of devices ranging from permanently mounted aircraft displays to portable user devices that have a touch screen, chart display capability, and capability to determine location with respect to an electronic chart. Such hardware and display capabilities are found in numerous consumer devices, for example, so called smartphones and a myriad of portable computing devices.

Figure 10:
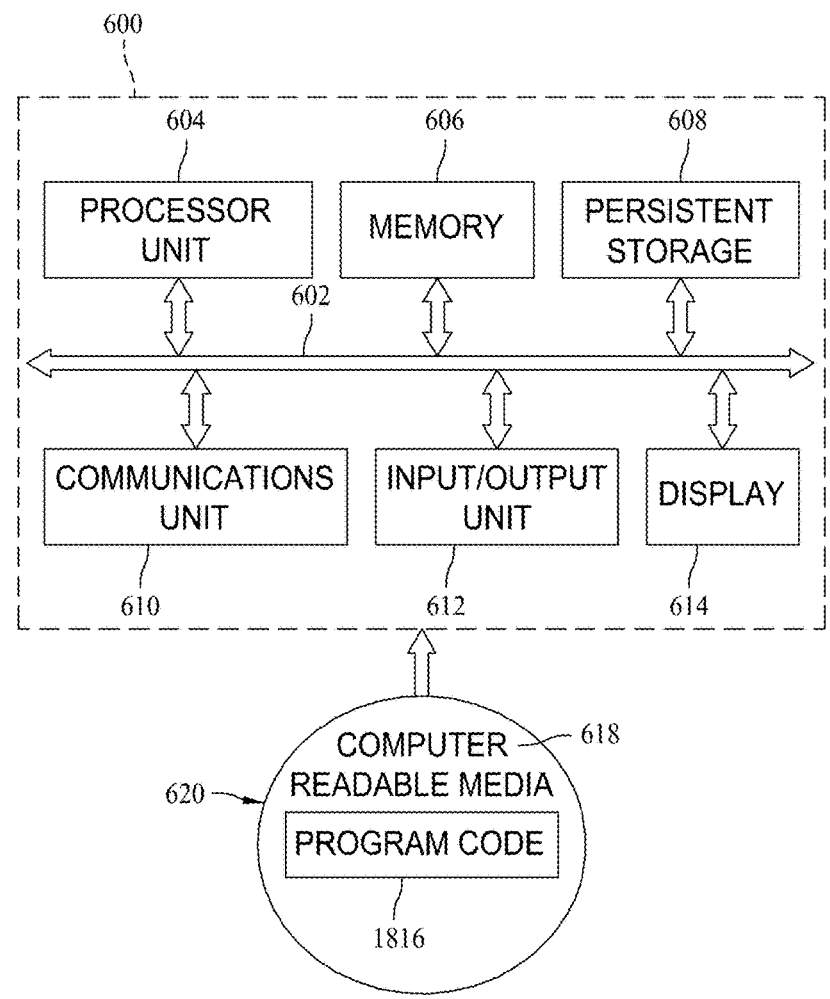
FIG. 10 is a diagram of a data processing system.

The described embodiments depend upon a combination of software techniques for manipulating, in real time, the graphical view of the charts to include one of the own ship symbols described herein, with the direction of the indicator or compass being controlled based on data received from one or more other flight units. With the range of devices capable of executing the software necessary for generating such displays understood, FIG. 10 is a diagram of one possible data processing system 600 that might be utilized in providing the embodiments described herein. As such, data processing system 600 is depicted in accordance with an illustrative embodiment. In this illustrative example, data processing system 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a set of one or more processors or may be a multi-processor core, depending on the particular implementation. Further, processor unit 604 may be implemented using one or more heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices. A storage device is any piece of hardware that is capable of storing information either on a temporary basis and/or a permanent basis. Memory 606, in these examples, may be, for example, without limitation, a random access memory or any other suitable volatile or non-volatile storage device. Persistent storage 608 may take various forms depending on the particular implementation. For example, without limitation, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, without limitation, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communication links.

Input/output unit 612 allows for input and output of data with other devices that may be connected to data processing system 600. For example, without limitation, input/output unit 612 may provide a connection for user input through a keyboard and mouse. Further, input/output unit 612 may send output to a printer. Display 614 provides a mechanism to display information to a user.

Instructions for the operating system and applications or programs are located on persistent storage 608. These instructions may be loaded into memory 606 for execution by processor unit 604. The processes of the different embodiments may be performed by processor unit 604 using computer implemented instructions, which may be located in a memory, such as memory 606. These instructions are referred to as program code, computer usable program code, or computer readable program code that may be read and executed by a processor in processor unit 604. The program code in the different embodiments may be embodied on different physical or tangible computer readable media, such as memory 606 or persistent storage 608.

Program code 616 is located in a functional form on computer readable media 618 that is selectively removable and may be loaded onto or transferred to data processing system 600 for execution by processor unit 604. Program code 616 and computer readable media 618 form computer program product 320 in these examples. In one example, computer readable media 618 may be in a tangible form, such as, for example, an optical or magnetic disc that is inserted or placed into a drive or other device that is part of persistent storage 608 for transfer onto a storage device, such as a hard drive that is part of persistent storage 608. In a tangible form, computer readable media 618 also may take the form of a persistent storage, such as a hard drive, a thumb drive, or a flash memory that is connected to data processing system 600. The tangible form of computer readable media 618 is also referred to as computer recordable storage media. In some instances, computer readable media 618 may not be removable.

Alternatively, program code 616 may be transferred to data processing system 600 from computer readable media 618 through a communications link to communications unit 610 and/or through a connection to input/output unit 612. The communications link and/or the connection may be physical or wireless in the illustrative examples. The computer readable media also may take the form of non-tangible media, such as communications links or wireless transmissions containing the program code.

In some illustrative embodiments, program code 616 may be downloaded over a network to persistent storage 608 from another device or data processing system for use within data processing system 600. For instance, program code stored in a computer readable storage medium in a server data processing system may be downloaded over a network from the server to data processing system 600. The data processing system providing program code 616 may be a server computer, a client computer, or some other device capable of storing and transmitting program code 616.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown.

As one example, a storage device in data processing system 600 is any hardware apparatus that may store data. Memory 606, persistent storage 608 and computer readable media 618 are examples of storage devices in a tangible form. The methods described herein may be encoded as executable instructions embodied in a computer readable medium, including, without limitation, a storage device or a memory area of a computing device. Such instructions, when executed by one or more processors, cause the processor(s) to perform at least a portion of the methods described herein.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 606 or a cache such as that found in an interface and memory controller hub that may be present in communications fabric 602.

As described herein, embodiments include one or more processors and memory devices. The processors are programmed to execute computer-executable instructions, which may be stored in a memory device, to perform the methods described herein. For example, any or all of the operations described herein may be encoded as computer-executable instructions and executed by processor. The methods described herein may be encoded as executable instructions embodied in a computer readable medium, including, without limitation, a storage device or a memory area of a computing device. Such instructions, when executed by one or more processors, cause the processor(s) to perform at least a portion of the methods described herein.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for depicting own ship on a display, said method comprising:

receiving, by a processing device, position data and heading data for own ship from at least one aircraft sensor;

correlating, by the processing device, the position data and heading data with data from a map database retrieved from a memory device coupled to the processing device;

generating, by the processing device, a map display on the display based on the correlation between the position data and the data from the map database;

generating, by the processing device on the map display, an own ship symbol that visually indicates a position and a heading of own ship relative to the map display and a north direction, the own ship symbol including a depiction of own ship, a circle surrounding the own ship depiction, and only one directional indicator proximate to and radially outward from the circle at a constant distance from a center of the circle, wherein the directional indicator translates circumferentially about the circle to remain radially outward from the circle and pointing towards the north direction, the directional indicator remaining viewable at all positions circumscribing the circle and at all altitudes based on the position and the heading of own ship; and displaying, by the processing device to a user on the display, the own ship symbol relative to the map display.

2. The method according to claim 1 wherein overlaying an own ship symbol on the map display further comprises encircling the own ship depiction with a compass rose overlay.

3. The method according to claim 1 wherein overlaying an own ship symbol on the map display further comprises at least one of an "N" within the circle, a north indicator outside of and proximate the circle, and a colored highlight proximate an "N" within a compass rose, the compass rose within the circle overlay.

4. The method according to claim 1 wherein overlaying, onto the map display on the unit, a depiction of own ship comprises orienting the own ship depiction with respect to the map display based on the map display being in one of a north up mode and a heading up mode.

5. The method according to claim 1 wherein overlaying an own ship symbol on the map display further comprises orienting the circle overlay and the directional indicator with respect to the own ship depiction based on the map display being in one of a north up mode and a heading up mode.

6. The method according to claim 1 further comprising rotating the directional indicator about the circle overlay and own ship depiction based on changes in heading data when the map display is in a heading up mode.

7. The method according to claim 1 further comprising rotating the own ship depiction within the circle overlay and with respect to the directional indicator based on changes in heading data when the map display is in a north up mode.

8. The method according to claim 1 further comprising rotating a compass rose overlay within the circle overlay about the own ship depiction based on changes in heading data when the map display is in a heading up mode.

9. The method according to claim 1 further comprising rotating the own ship depiction with respect to a compass rose overlay within the circle overlay based on changes in heading data when the map display is in a north up mode.

10. The method according to claim 1 wherein the directional indicator is one of a triangle or arrow that points in the north direction.

11. A system comprising:

a processing device;

a memory communicatively coupled to said processing device, said memory comprising map data;

a display communicatively coupled to said processing device; and a communications interface communicatively coupled to said processing device, said processing device configured to:

receive position data and heading data for own ship from at least one aircraft sensor via said communications interface;

correlate the received position data and heading data with said map data retrieved from said memory;

generate a map display on said display based on the correlation between the position data and said map data;

generate an own ship symbol that visually indicates a position and a heading of own ship relative to the map display and a north direction, the own ship symbol including a depiction of own ship, a circle surrounding the own ship depiction, and only one directional indicator proximate to and radially outward from the circle at a constant distance from a center of the circle, wherein the directional indicator translates circumferentially about the circle to remain radially outward from the circle and pointing towards the north direction, the directional indicator remaining viewable at all positions circumscribing the circle and at all altitudes based on the position and the heading of own ship; and display, to a user on said display, the own ship symbol relative to the map display.

12. The system according to claim 11 wherein to overlay an own ship symbol on said display, said processing device is operable to encircle the own ship depiction with a compass rose overlay.

13. The system according to claim 11 wherein to overlay an own ship symbol on said display, said processing device is operable to cause said display to display at least one of an "N" within the circle indicative of a north direction, a north indicator outside of and proximate the circle, and a colored highlight proximate an "N" within a compass rose, the compass rose within the circle overlay.

14. The system according to claim 11 wherein to overlay a depiction of own ship on said display said processing device is operable to orient the own ship depiction with respect to the map display based on the map display being in one of a north up mode and a heading up mode.

15. The system according to claim 11 wherein to overlay an own ship symbol on said display, said processing device is operable to orient the circle overlay and a north indicator with respect to the own ship depiction based on the map display being in one of a north up mode and a heading up mode.

16. The system according to claim 11 wherein said processing device is operable to cause the directional indicator to rotate about the circle overlay and own ship depiction based on changes in heading data received via said communications interface when the map display is in a heading up mode.

17. The system according to claim 11 wherein said processing device is operable to cause the own ship depiction to rotate within the circle and with respect to the directional indicator based on changes in heading data received via said communications interface when the map display is in a north up mode.

18. The system according to claim 11 wherein said processing device is operable to cause a compass rose within the circle overlay to rotate about the own ship depiction based on changes in heading data received via said communications interface when the map display is in a heading up mode.

19. The system according to claim 11 wherein said processing device is operable to cause the own ship depiction to rotate with respect to a compass rose within the circle overlay based on changes in heading data received via said communications interface when the map display is in a north up mode.

20. One or more computer-readable storage media having computer-executable instructions embodied thereon, wherein when executed by at least one processor, the computer-executable instructions cause the at least one processor to:

receive position data and heading data for own ship from at least one aircraft sensor;

correlate the position data and heading data with data from a map database retrieved from a memory device coupled to the processing device;

generate a map display based on the correlation between the position data and the data from the map database;

generate an own ship symbol that visually indicates a position and a heading of own ship relative to the map display and a north direction, the own ship symbol including a depiction of own ship, a circle surrounding the own ship depiction, and only one directional indicator proximate to and radially outward from the circle at a constant distance from a center of the circle, wherein the directional indicator translates circumferentially about the circle to remain radially outward from the circle and pointing towards the north direction, the directional indicator remaining viewable at all positions circumscribing the circle and at all altitudes based on the position and the heading of own ship; and display, to a user on said display, the own ship symbol relative to the map display.

21. The method according to claim 1 wherein overlaying an own ship symbol on the map display comprises overlaying an opaque own ship symbol on the map display.

22. The system according to claim 11 wherein to overlay an own ship symbol on said display said processing device is operable to overlay an opaque own ship symbol on said display.

* * * * *